United States Patent
Schmiegel et al.

(10) Patent No.: US 7,406,192 B2
(45) Date of Patent: Jul. 29, 2008

(54) METHOD FOR DETERMINING THE CHANGE IN POSITION OF AN ITEM OF LUGGAGE IN ORDER TO EXAMINE A SUSPECT REGION IN THIS ITEM OF LUGGAGE

(75) Inventors: Armin Schmiegel, Hamburg (DE); Helmut Strecker, Hamburg (DE)

(73) Assignee: GE Homeland Protection, Inc., Newark, CA (US)

( * ) Notice: Subject to any disclaimer, the term of this patent is extended or adjusted under 35 U.S.C. 154(b) by 708 days.

(21) Appl. No.: 10/960,348

(22) Filed: Oct. 6, 2004

(65) Prior Publication Data
US 2005/0123217 A1 Jun. 9, 2005

(30) Foreign Application Priority Data
Oct. 6, 2003 (DE) ................. 103 46 269

(51) Int. Cl.
G06K 9/00 (2006.01)
G01N 23/04 (2006.01)

(52) U.S. Cl. ............... 382/152; 382/103; 382/143; 378/57

(58) Field of Classification Search ............ 382/103, 382/143, 151–152, 195, 209, 218, 298; 348/82; 378/57
See application file for complete search history.

(56) References Cited

U.S. PATENT DOCUMENTS

| | | | |
|---|---|---|---|
| 5,080,856 A * | 1/1992 | Grenier et al. ........... 376/159 |
| 5,182,764 A | 1/1993 | Peschmann et al. |
| 5,367,552 A | 11/1994 | Peschmann |
| 5,412,837 A | 5/1995 | Wörwag |
| 5,692,029 A * | 11/1997 | Husseiny et al. ............ 378/88 |
| 5,768,334 A | 6/1998 | Maitrejean |
| 5,796,802 A * | 8/1998 | Gordon ....................... 378/8 |
| 5,838,758 A * | 11/1998 | Krug et al. ................. 378/53 |
| 6,198,795 B1 | 3/2001 | Naumann et al. |
| 6,393,095 B1 | 5/2002 | Robinson |
| 6,584,170 B2 | 6/2003 | Aust et al. |
| 6,587,595 B1 | 7/2003 | Henkel et al. |
| 2003/0169843 A1 | 9/2003 | Cordes |
| 2003/0190011 A1 | 10/2003 | Beneke et al. |
| 2007/0195994 A1* | 8/2007 | McClelland et al. ........ 382/103 |

FOREIGN PATENT DOCUMENTS

| | | |
|---|---|---|
| DE | 37 08 843 C2 | 3/1988 |
| DE | 4 42 06 187 A1 | 11/1993 |
| DE | 44 06 956 A | 9/1995 |

(Continued)

OTHER PUBLICATIONS

Tschumperle, D. et al., "Diffusion PDE's on Vector-Valued Images" IEEE Signal Processing Magazine, pp. 16-25, Sep. 2002.
Fischler, Martin A. et al., "Random Sample Consensus: A Paradigm for Model Fitting with Applications to Image analysis and Automated Cartography" in Comm. Of the ACM, vol. 24, pp. 381-395, Jun. 1981.

(Continued)

*Primary Examiner*—Daniel G Mariam
(74) *Attorney, Agent, or Firm*—Squire, Sanders & Dempsey L.L.P.

(57) ABSTRACT

The invention relates to a method for determining the change in position of an item of luggage in order to examine a suspect region in this item of luggage.

14 Claims, 7 Drawing Sheets

FOREIGN PATENT DOCUMENTS

| | | |
|---|---|---|
| DE | 197 56 697 A1 | 7/1999 |
| DE | 198 12 055 C2 | 9/1999 |
| DE | 198 55 250 A1 | 6/2000 |
| DE | 101 39 672 A1 | 3/2003 |
| DE | 101 49 254 A1 | 5/2003 |
| EP | 0 701 703 B1 | 12/1994 |
| EP | 03100330 * | 2/2003 |
| GB | 2 359 720 A | 8/2007 |
| WO | WO-97/12229 A1 | 4/1997 |
| WO | WO-98/33063 A1 | 7/1998 |
| WO | WO-03/065 077 A2 | 8/2003 |
| WO | WO-2004/072685 | 8/2004 |

OTHER PUBLICATIONS

"Skalenpyriamid", (Multiskalenreprasentation) (Scale Pyramids), Jahne, Digitale bildverarbeitung [Digital Image Processing, Springer, pp. 132-147, 1997.

Hartley, R. et al., Multiple View Geometry in Computer Vision, 2$^{nd}$ Edition, Cambridge University Press, pp. 344-353, Mar. 2004.

Pollak, I. "Segmentation and Restoration via Nonlinear Multiscale Filtering." IEEE Signal Processing Magazine, pp. 26-36, Sep. 2002.

* cited by examiner

METHOD FOR DETERMINING THE CHANGE IN POSITION OF AN ITEM OF LUGGAGE IN ORDER TO EXAMINE A SUSPECT REGION IN THIS ITEM OF LUGGAGE

CROSS REFERENCE TO RELATED APPLICATION

This application claims benefit of priority under 35 U.S.C. §119 and incorporates by reference German Patent Application No. 103 46 269.4 filed Oct. 6, 2003.

FIELD OF THE INVENTION

The invention relates to a method for determining the change in position of an item of luggage in order to examine a suspect region in this item of luggage.

BACKGROUND

Currently it is possible to analyze items of luggage completely for explosives. The underlying analysis methods prove very reliable but also laborious. Such a laborious analysis can take place in airports only in so-called third-stage apparatuses. There, the quantity of items of luggage processed is much smaller than with the first- and second-stage apparatuses. With these third-stage apparatuses a high detection rate and a low false alarm rate is required. In order to be able to use such a third-stage apparatus as a second-stage apparatus also, the analysis time must be clearly reduced.

This problem has been solved to date by allowing no physical separation between a first-stage and a second-stage apparatus (see U.S. Pat. No. 5,182,764) or preventing a physical movement or rotation of the item of luggage (see WO 03/065077 A2). However this is very costly and hardly feasible in practice.

SUMMARY

The object of the invention is therefore to provide a method which on the one hand has a high detection rate with simultaneously low false alarm rate, but has a much shorter examination time compared with the known methods with the abovementioned framework conditions.

The object is achieved by a method with the features of claim 1. With the method according to the invention the relative change in position of the item of luggage is calculated by comparing two pictures of the same item of luggage which have been recorded in different examination systems. Because the coordinates of a suspect region, which have been obtained in the first examination system are known, it is possible in the second examination system to examine in more detail only this suspect region, the coordinates of which from the first examination system have now been converted to the coordinates in the second examination system. As a result, the time spent analyzing once again all the parts of the item of luggage that have already been identified as a non-suspect region is saved. Any imaging system is possible as first and second examination systems, provided the calculation of the angles of rotation is to take place about the vertical and horizontal axes and also the translation. These include both video images and transmission images, for example by means of X-ray radiation. How the suspect region is obtained in the first examination system is not essential to the invention, with the result that for the first examination system and the second examination system, apparatuses can be used that operate on completely different technological principles. For the second examination machine, a transmission system is preferred in respect of the examination of the suspect region, but the invention is by no means limited to this. It is equally possible to use e.g. magnetic resonance tomography. In addition, the two examination systems can also be far apart. The item of luggage to be examined can be carried by hand or transported via a vehicle with the result that even a conveyor belt between them can be dispensed with. Consequently, there is an enormous saving as a result of the method according to the invention in analysis time with a simultaneously high detection rate and low false alarm rate.

An advantageous development of the invention provides that an optical and/or geometrical pre-processing of the first and/or second transmission image takes place before determination of the change in position. By an optical pre-processing it is meant within the scope of this invention that the image information of a transmission image is manipulated such that the function of the image registration is improved in respect of accuracy and reliability. This can be achieved for example by carrying out a local averaging and median formation to reduce the noise. In addition, non-linear scale filters (see G. Aubert & P. Komprobst: Mathematical Problems in Image Processing: Partial Differential Equations and the Calculus of Variations. Springer, N.Y., 2002) can also be used. These filters reduce the image information content inside image segments, but retain edges so that the position of the image segments does not change. As a result, perspective changes due to different viewing angles in the two examination systems can be compensated. A further possibility is to use look-up tables, gamma filters or histogram filters, as a result of which identical absorptions also look the same within the transmission image, which is necessary in particular if the two examination systems are constructed or operate differently. Local features, e.g. edges, points or massive objects, can also be highlighted. Finally, by geometric pre-processing is meant within the framework of this application a geometric rectification. This is necessary whenever the two examination systems have different geometries. In such a case, different representations result even if the examined item of luggage is in the same position. Optical pre-processing makes possible a better basis for comparing the pictures of the item of luggage of the first and second examination systems. This leads to a simpler determination of the first angle of rotation about the vertical axis, the second angle of rotation about the horizontal axis and the translation.

A further advantageous development of the invention provides that several sets of first and/or second angles of rotation are issued in the case of ambiguities. Although it is necessary as a result to examine several suspect regions, as a rule only a few regions are left over, with the result that there is a clear reduction in the regions to be examined in the item of luggage. At the same time the detection rate is kept high and the false alarm rate remains low. The two hypotheses used are that the item of luggage has or has not been flipped, i.e. that it is lying on the same side or on its opposite side. Ambiguities occur if the method cannot decide clearly between these two hypotheses. Preferred is the input in each case of a probability value or a confidence value (a number or a vector of numbers which provides information about the reliability of a result) for the first and/or second angles of rotation. As a result, an appraisal of the suspect regions found is carried out and an examination can be carried out first of the region for which the angles with the highest probability value have been found. As a result it is more probable that dangerous contents of the item of luggage will be discovered more quickly. By a probability value is meant in the present application a value which provides information as to how high the reliability of the determined values for translation and angles of rotation is (which also indicates whether the item of luggage has been flipped over or not). This probability value can be used to allow other entities (both a person and a machine) to decide on the quality of the image registration. For example, a threshold value is used which, if not reached, causes the whole item of luggage to be scanned once again in the second examination system. A further advantageous development of the invention provides that the change in position of the item of luggage is determined using global features, in particular correlation, "mutual information" (see description relating to FIG. 3) or radial dimensional variables. One of the two pictures of the item of luggage is rotated until it is most similar to the other picture. The point of rotation must be defined in both pictures. Preferably the centre of gravity of the image of the item of luggage is used. $I_{ij}$ is the intensity value of the image at point (ij). The resultant coordinates of the centre of gravity of the image $(x_g, y_g)$ are then:

$$x_g = \frac{\sum_{i,j} x_i I_{i,j}}{\sum_{i,j} I_{i,j}}, y_g = \frac{\sum_{i,j} y_i I_{i,j}}{\sum_{i,j} I_{i,j}}.$$

In addition to the use of correlation and "mutual information", the use of radial dimensional variables is also possible. The picture is divided into N angle segments (the evaluation takes place in each case in an angle range between $\phi$ and $\phi+\Delta\phi$) which are appraised with different values, e.g. statistical moments. The values of the Nth segments are then compared with the values of the N+nth segment, n corresponding to the angle increment. This measurement is preferably coupled with a scale analysis. The results on different linear scales, i.e. at different resolutions, are compared and these findings are combined, as a result of which a reduced calculation time is obtained. Thus the calculation time is reduced by a factor of 4 if the resolution is halved, as fewer image spots must be analyzed. Preferably different comparison values can also be used and their result taken jointly into account. By a comparison value is meant within the framework of the application a function which has the two pictures as input parameters and provides a number or a vector. This issued value is then related to the difference between the two images. The simplest example of this is the difference between the two image spots. If this is small, the two pictures are identical. By global features is meant within the framework of this application that all image spots of the image are used for image registration. This differs from the local features given below which are used as a subset of all these image spots. The respective subset must be determined. One possibility for this is the detection of corners and edges.

A further advantageous development of the invention provides that the change in position of the item of luggage is determined using local features, in particular using "Random Sample Consensus" (RANSAC), robust estimation methods, Hough transformations or least-square methods. Suitable local features are sought in both pictures, e.g. corners, edges, lines, significant points or small, easily-identifiable objects (such as metal buttons) inside the item of luggage. These features are allocated to one another by ascertaining where a specific feature in one picture is to be found in the second picture. As a result it is possible to determine the information necessary for the transformation of the coordinates of the suspect region—namely the first angle of rotation about the vertical axis, the second angle of rotation about the horizontal axis and the translation—by which the features can be changed into one another. This method delivers more accurate results if the mapping geometries of the two imaging systems are known. The question of which of the preferred methods— RANSAC (see also on this: "Random Sample Consensus: A Paradigm for Model Fitting with Applications to Image Analysis and Automated Cartography" in Comm. of the ACM, Vol. 24, p. 381-395, 1981), robust estimation methods, Hough transformations or least-square methods—is used depends on the calculation speed and the quality of the allocation of the features. For the allocation of the features, reference can be made to the same values as for global image information.

Particularly preferably the determination of the change in position of the item of luggage is carried out using a coupling of the analysis by means of global features with an analysis by means of local features. Such a coupling can take place for example by using both image registration methods and forming a weighted average of the two results. This weighted average can then serve as a function of the probability value. Another coupling can also take place by using the local features only when the probability value of the global features is not high enough. As a result particularly reliable and rapidly obtainable information on the transformation of the coordinates is obtained.

A further advantageous development of the invention provides that the determination of the change in position using local features takes place on different linear scales. For example, this can take place in that the calculation is carried out on one linear scale and the results compared with a comparable analysis on another linear scale. Preferably, the local features are chosen according to the linear scale. On each linear scale the features are chosen which can best be measured there. This leads to a simplification of the determination of the change in position of the item of luggage. For example, the original image of the picture is used as linear scale 1. Linear scale 2 then corresponds to the original image with lower resolution (see on this point also Skalenpyramide [Scale Pyramids] in Jäahne, Digitale Bildverarbeitung [Digital Image Processing], Springer 1997). By a scale analysis is meant within the framework of this application that the resolution of the pictures is successively increased. Image registration is then carried out at each resolution stage. Firstly, the image registration of a coarse resolution begins, for example the linear scale 4. This produces a position with a confidence interval. Then the resolution is increased, for example to the linear scale 3, and the image registration is operated only in the confidence interval. These steps are then carried out up to maximum resolution (original image of the linear scale 1). The advantage comprises on the one hand the reduced calculation time and on the other hand the robustness of this method vis-à-vis geometric distortions which can lead to incorrect registrations, in particular at higher resolutions.

A further advantageous development of the invention provides that only the local features are used which do not contradict the analysis using the global features. As a result the allocation of the local features is improved.

Further advantageous developments of the invention are the subject of the dependent claims.

BRIEF DESCRIPTION OF THE DRAWINGS

Advantageous designs of the invention are explained in more detail with reference to the drawings. Individually there are shown in.

DETAILED DESCRIPTION

Figure 1:
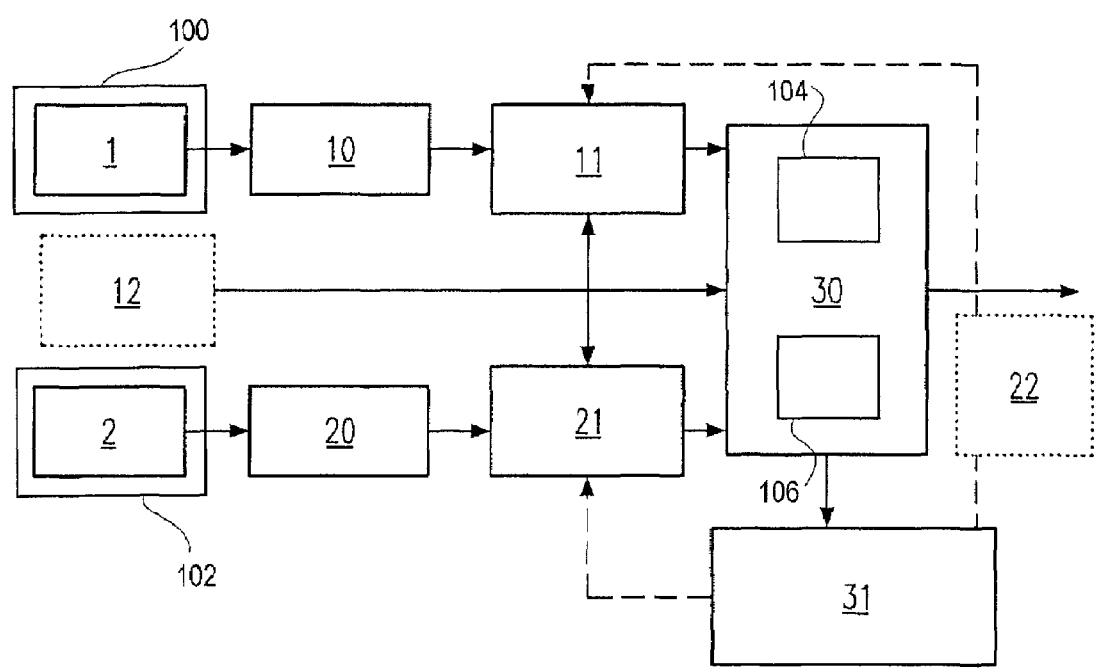
FIG. 1 a flowchart of a method for comparing the pictures of an item of luggage and for determining the change in position of the item of luggage, FIGS. 2a-c representations of the different pre-processing steps using an item of luggage, FIGS. 3a-d four stages with different dimensional scales for carrying out the scale analysis, FIG. 4 diagram of a determination of position by means of "mutual information", FIG. 5 diagram of a determination of position by means of scale analysis and image comparison by correlation, FIGS. 6a-d example of a features extraction by means of local features with reference to two representations of an item of luggage in different arrangement with correlated sections in each case and FIG. 7 example of a successful image match on the basis of the method according to the invention with an item of luggage in two different positions.
Figure 8:
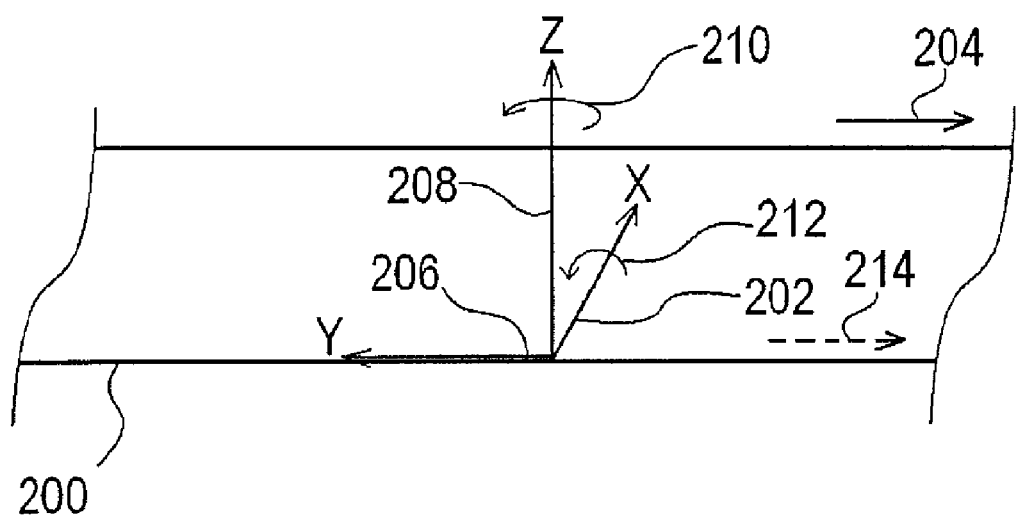
FIG. 8 is a perspective view of a conveyer belt and a coordinate system according to an embodiment of the present invention, showing a first angle of rotation about a vertical axis, a second angle of rotation about a horizontal axis, and a translation.

FIG. 1 shows a flowchart with a schematic representation of a method for comparing the picture of an item of luggage 4 and for determining the change in position of the item of luggage 4. A common coordinates system is agreed for the two examination systems. As shown in FIG. 8, a reference system geared to the conveyor belt 200 has proved to be practicable. It is a Cartesian coordinates system the X-axis 202 of which runs transverse to the direction of transport 204 and the zero point of which lies on the edge of the conveyor belt. The Y-coordinate 206 points against the direction of transport and begins at the edge of the suitcase. The Z-coordinate 208 begins on the conveyor belt and points upwards. A right-handed coordinates system thus results. In the embodiment shown only a single angle of rotation 210 is given which relates to a rotation of the item of luggage 4 about the Z-axis 208. The second angle of rotation 212 usually required is replaced by information whether the item of luggage 4 has been flipped or not. By "flip" is meant here a rotation of the item of luggage by 180° about the X-axis. To be able to carry out a clear transfer from the first examination system into the second examination system, translation 214 must still be defined. It is the movement of the item of luggage 4 on the conveyor belt in the X-Y plane.

In a first-stage apparatus 100, a first picture or first transmission image 1 is taken. The item of luggage 4 (see FIGS. 2, 3, 6 and 7) is in a position determined by the first transmission image 1. In a second transmission unit 102 a second picture or second transmission image 2 of the same item of luggage 4 is taken in a second position which usually deviates from the first position. Firstly both transmission images 1, 2 are each subjected to a pre-processing 10, 20. Both a geometric rectification and an optical pre-processing of the intensities are carried out. More precise details are explained below with reference to FIGS. 2a-c. Different features of the respective image contents are then measured to be able to undertake a features extraction 11, 21. Comparative features are also determined. More precise details on the features extraction 11, 21 and the resulting determination of position through the establishment of the change in position of the comparative features are detailed below with reference to FIGS. 3a-d, 4, 5 and 6a-d (FIGS. 4, 5 and 6 a-d being provided with arbitrary X- and Y-scale values). The extracted features are appraised. With the help of the suitable features, a calculation 30 of the change in position is carried out. The method according to the invention works particularly well if it has the possibility of appraising a made angle estimation and issuing one or more angles of rotation plus an angular measure. As a result the inclusion of errors, caused by an incorrect angle determination, in the subsequent analysis is prevented. There is then also a geometric transformation 31 of the images. In addition to the image of the first stage of the first-stage apparatus, a first list 12 of coordinates of the first suspect regions 13 is provided as well. Following the successful determination of the position via the calculation 30 of the change in position, a second list 22 with transformed second suspect regions 23 is calculated and issued, which then relates to the second transmission image 2.

Figure 2C:
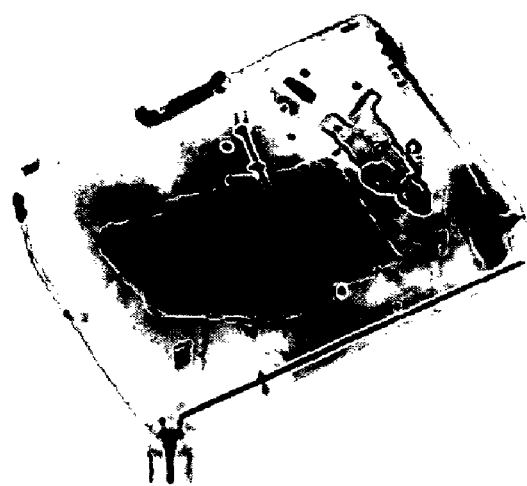
Figure 2B:
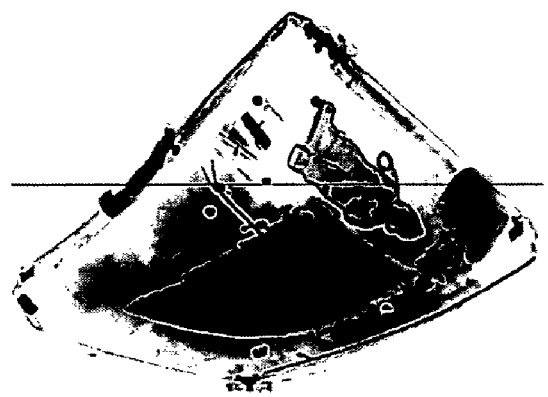
Figure 2A:
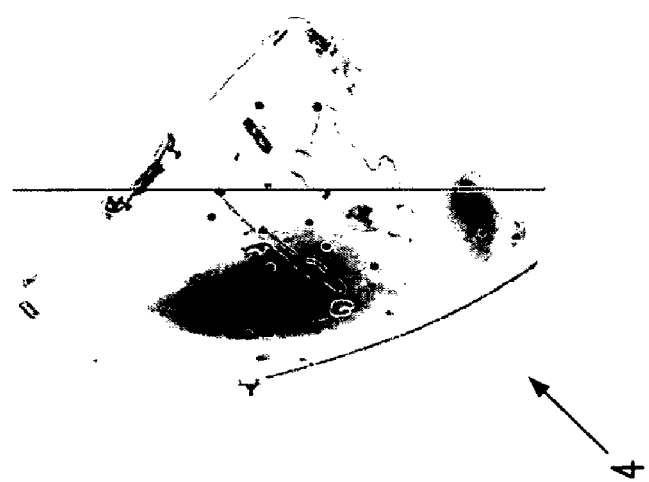
Figures 3C, 3D:
Figures 3A, 3B:

Three phases in respect of the pre-processing 10 of a first transmission image 1, also representing the second transmission image 2, are shown in FIG. 2. The type of pre-processing 10, 20 depends on the transmission apparatuses used and their mapping geometry. In the example given here, it is a detector with L-shaped geometry. The originally recorded transmission image 1, 2 is shown in FIG. 2a. In a first pre-processing step an optical calibration is carried out in which the full dynamic range of the intensity values is used, a so-called histogram adaptation (FIG. 2b).

The result of the representation of the item of luggage 4 after carrying out a second step can be seen in FIG. 2c. The distorted image has been rectified. This is possible without problems if the geometry of the transmission unit, in particular the arrangement of the X-ray tubes relative to the detector and also the relative position of the object relative to both and the geometry of the detector are known.

The two steps mentioned above together serve to place images from different transmission apparatuses onto a common, comparable basis.

The four lowermost steps of a scale pyramid are shown in FIGS. 3a-d. These are used in the features extraction 11, 21. The resolution increases gradually from FIG. 3a to FIG. 3d. In addition to the use of four stages of the scale pyramid, any other number of stages is also possible.

The use of firstly a scale analysis and secondly an image comparison by means of correlation and "mutual information" is described here as an example of features extraction. Following the pre-processing 10, 20 of the transmission images 1, 2, these are subjected to scale analysis. This means that the correlation $$C(I_1(r, \phi), I_2(r, \phi + \Delta\phi)) = \sum_{r,\phi} (I_1(r, \phi) - \bar{I}_1(r, \phi))(I_2(r, \phi) - \bar{I}_2(r, \phi))$$

is calculated here on different spatial resolutions or linear scales. $I_1$ and $I_2$ correspond to the projections of the transmission images onto the conveyor belt. For simplicity's sake, the Cartesian coordinates have been transformed into polar coordinates. A projection onto other planes is equally possible. The image on the coarsest linear scale (see FIG. 3a) consists of only approx. 40×40 image spots. In these images, the topology changes which always occur with rotated objects in transmission images play a diminished role. The further analysis initially takes place using only the coarsest linear scale. It is then gradually extended also to include finer linear scales with higher resolution. On the lowest plane of the first transmission image 1, which is usually called first-stage image, this is compared with a prescanner image of the second transmission image 2 by means of a correlation method for different angles of rotation. This is also carried out with a suitcase flipped by 180°. In the present example the above-mentioned value $C(I_1(r, \phi), I_2(r, \phi+\Delta\phi))$ is used as a measure of correlation between the standardized transmission images 1, 2. $\bar{I}_{1,2}$ are the average intensities of the image, $I_{1,2}(r,\phi)$ the intensity value for r and $\phi$. Alternatively, "mutual information" can also be used. In this case the three probability densities p(a), p(b) and p(a,b) are calculated. p(a) and p(b) are the probability densities of specific amplitude values, p(a,b) the probability density that a pixel simultaneously has a value a and a value b. The "mutual information" of these three probability densities is compared. The result is:

$$I=H(p(a))+H(p(b))-H(p(a,b))$$

H stands for entropy. This is defined from:

$$H(p(x_1, \ldots, x_n)) = \int_{-\infty}^{\infty} dx_1 \ldots \int_{-\infty}^{\infty} dx_n p(x_1, \ldots, x_n) \log(p(x_1, \ldots, x_n)).$$

The calculation of the correlation or the "mutual information" corresponds to the step of features extraction 11, 21 as well as in parts the calculation of the change in position 30. With a determination of position using global features, the image is also rotated about its centre of gravity on the lowest variables scale.

Figure 4:
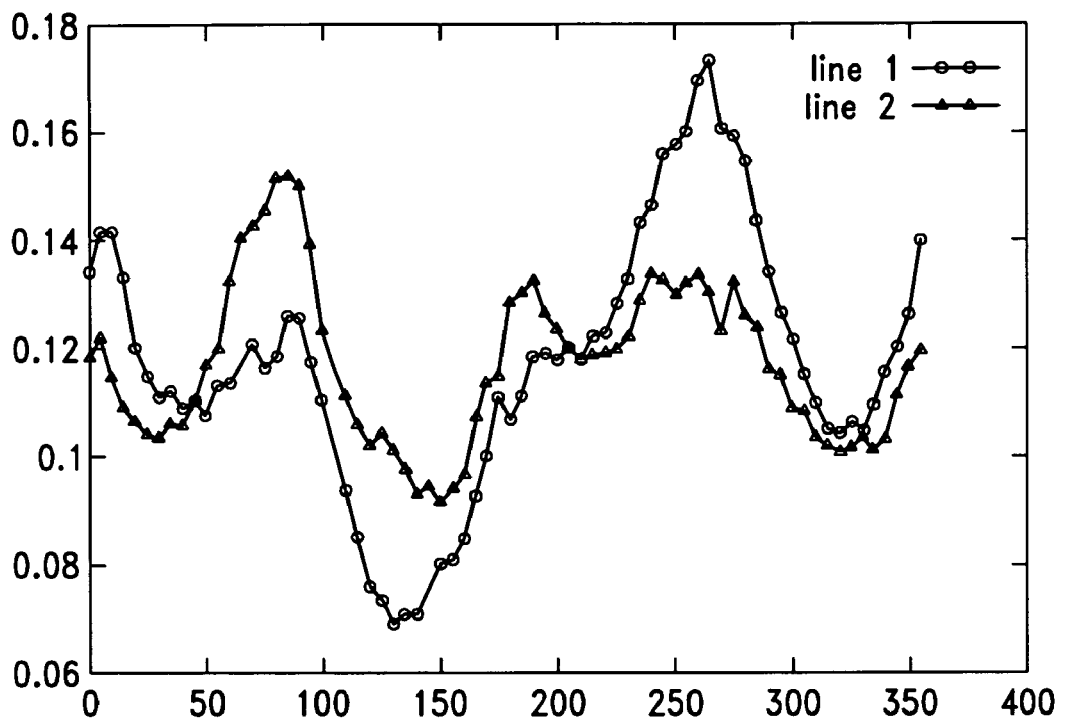

In FIG. 4 the pattern of the values for various angles of rotation is shown. The image with the coarsest linear scale of the second transmission image 2 has been rotated about its centre of gravity and compared with the image of the first-stage apparatus, i.e. the first transmission image I with regard to its centre of gravity. The value analysis on the coarsest linear scale delivers different maximum points. These are used in the next step to determine the values more accurately on the higher planes. This means that, instead of tuning all the angles of rotation on every plane, only the best candidates are used on the next-highest plane.

At the end of this analysis, which has been carried out on all the planes of the scale pyramid, the correlation results are analyzed and the angle of rotation of the item of luggage 4 determined. Other data can be and are also still taken into account. With the help of the instantaneous analysis of the image, the angles of rotation of the two transmission images 1, 2 have been calculated and compared with the result of the method described above. In addition, the maxima of the different values of the flipped or unflipped item of luggage 4 have been compared with each other and evaluated. Where the analysis cannot determine an unambiguous angle, further angles are then issued if necessary. A further refinement is possible using local features (see below re FIGS. 6a-d). As the change in position of the item of luggage 4 is known, the new position of the suspect region can be estimated. A final scan can now be carried out in this region. The lines shown in FIG. 4 belong in one case to a non-flipped suitcase (line 1) and in the other case to a flipped suitcase (line 2).

Figure 5:
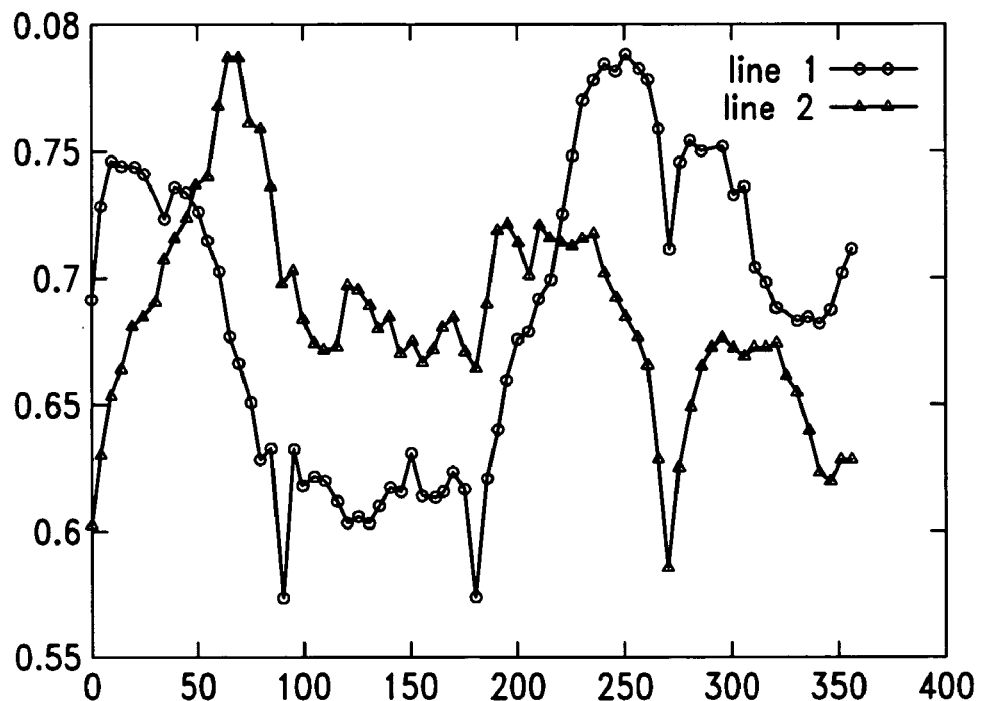

FIG. 5 shows, instead of the "mutual information" of FIG. 4, the correlation for different angular measures of the first transmission image I with the second transmission image 2 on the coarsest linear scale. Two lines are shown here also, one line (line 1) belonging to a non-flipped suitcase and the second line (line 2) corresponding to a flipped suitcase.

Figure 6A:
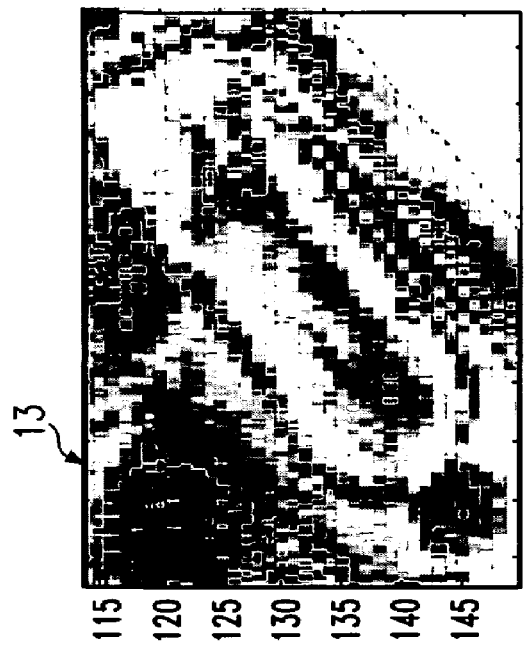
Figure 6B:
Figure 6C:
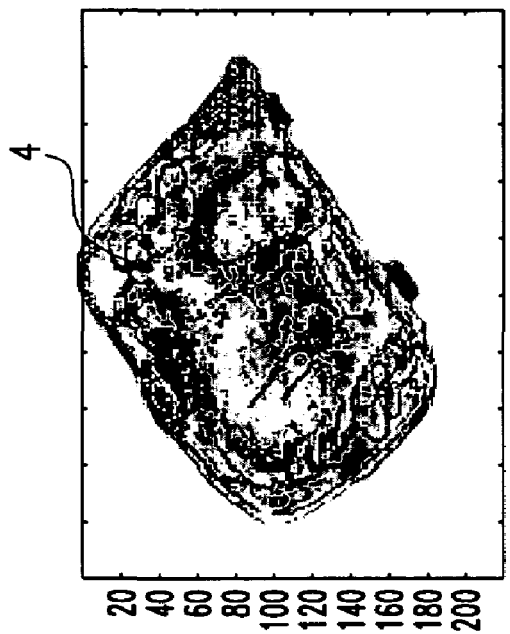
Figure 6D:
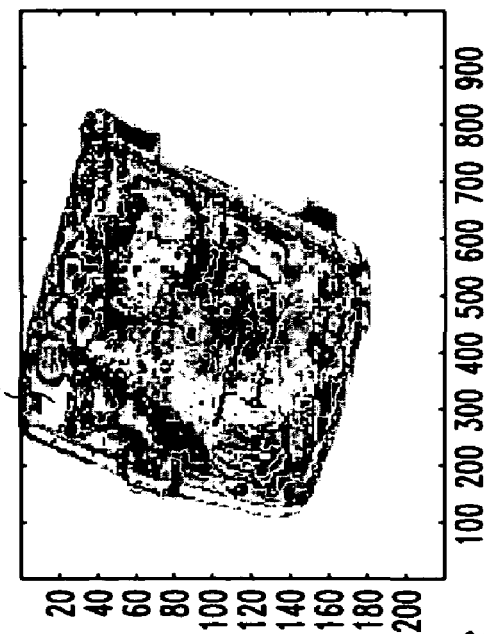

FIGS. 6a-d show the method of features extraction 11, 21 using local features. FIGS. 6a and 6c show the same item of luggage 4 in different positions. FIG. 6b shows a first image section 13 from FIG. 6a in which a bottle can be seen. The same bottle has been found in FIG. 6d after implementing the method according to the invention.

The determination of position by means of local features can be carried out for itself alone or as a postprocessing step to a position determination using the global features (as carried out above for FIGS. 3a-d). The preprocessing 10, 20 for this has been carried out in advance. Further steps may possibly still be necessary, depending on how the local features are defined. Various first image sections 13 with local features are firstly ascertained from the first transmission image 1. This can be achieved for example by determining edges, corners or regions of high intensity. In addition, the entropy of the local amplitude statistics can also be measured. The amplitude statistics describe the probability density inside the first image section 13 x $\in[x_0,x_0+L_x]$, y $\in[y_0,y_0+L_y]$ of obtaining a specific amplitude value $\bar{I}$. It is calculated from:

$$p_{x_0,y_0}(\bar{I}) = \sum_{x=x_0}^{L_x} \sum_{y=y_0}^{L_y} \delta(I(x, y) - \bar{I}).$$

$L_x$, $L_y$ describe the size of the first image section 13 and $x_0$, $y_0$ the position of the first image section 13 in the image. $\delta$ represents a delta function. This is one if the intensity of the first image section 13 corresponds to the value $\bar{I}$.

A characteristic of the amplitude statistics is that they contain no spatial information. They are therefore independent of the relative position of individual objects of the first image section 13.

Analogously, in the second transmission image 2 local features are likewise sought according to the same or sensibly broadened rules, which corresponds to the second features extraction 21 shown in FIG. 1. For both transmission images 1, 2 there is a set of features with their coordinates $\{X_{1,2}(x, y)\}$. In the next step an attempt is made to allocate the different features to one another. Alternatively the search for features in an image can be dispensed with. The features of the other transmission image 1, 2 are then sought in the complete image.

By way of example, the features are described below via their amplitude statistics. It is assumed that the two image sections 13, 23 of FIGS. 6b and 6d which are the most similar contain the sought feature. In the method shown here, the difference as regards the different moments of the amplitude statistics and the entropy has been used as a measure of similarity. Other measures of similarity are for example the value of the convolution integral of the probability densities.

A first image section 13 (FIG. 6b) has been chosen from the first transmission image 1 of the item of luggage 4 (FIG. 6a). A second image section 23 with the same dimensions has been sought in the second transmission image 2 (FIG. 6c) which resembles the first image section 13 in its statistical properties. As the second image section 23 of FIG. 6b is a rectangle, but the position of the item of luggage 4 has changed between FIG. 6a and FIG. 6c through a rotation, not all of the bottle is mapped in FIG. 6d. This problem could be overcome for example by using not rectangular, but circular, image sections 13, 23.

As a result, some of the different features were able to be allocated to one another. The pairs thus describe two views of the same feature. If it is assumed the only the item of luggage 4, but not its contents, has changed position, it is possible to calculate the change in position 30 of the item of luggage 4 using the new coordinates.

It is true for each feature $x_i$ that it satisfies the valid mapping equation (see also Richard Hartley and Andrew Zisserman in "Multiple View Geometry in Computer Vision"; Second Edition; Cambridge University Press, March 2004), which reads:

$$0 = x'^T_i F x_i.$$

F represents the fundamental matrix of the imaging system, x' the mapped spot and x the coordinates of the real spot. The relationship of the pair of features is thus the following:

$$0 = x'^T_i F_1 x_i$$

$$0 = x''^T_i F_2 T_{\psi,\phi,x,y} x_i$$

$T_{\psi,\phi,x,y}$ describes the change in position of the feature (translations and rotations); x" stands for the image coordinates in the second transmission image 2.

There is a range of different techniques for the solution of this mathematical problem. If it is guaranteed that the allocations of the features is good enough, an attempt can be made using a least-square method to determine the sought angles of rotation and translations. Otherwise, so-called robust estimation methods can be used.

Figure 7:
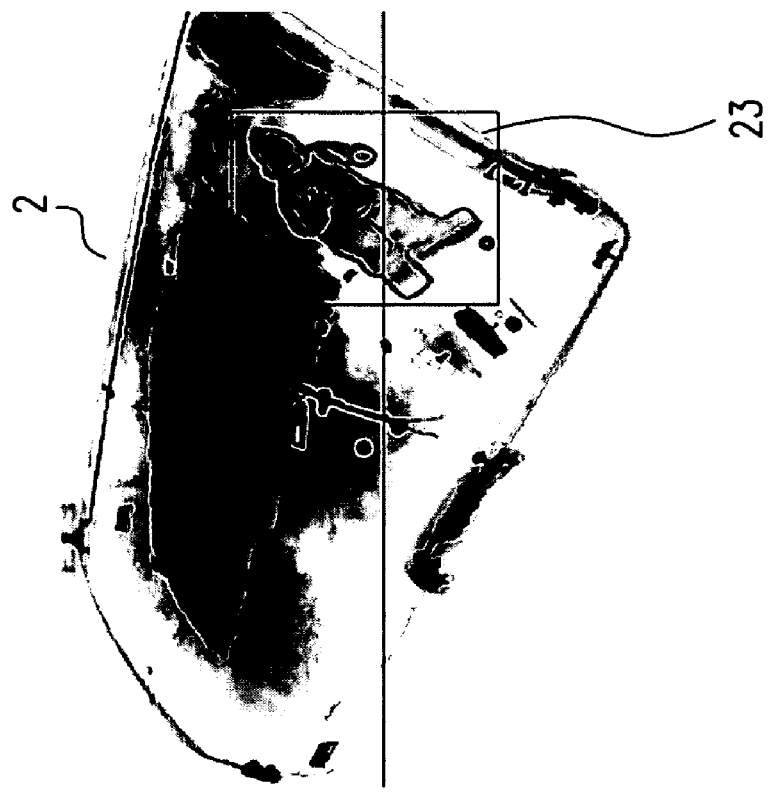
Figure 7:
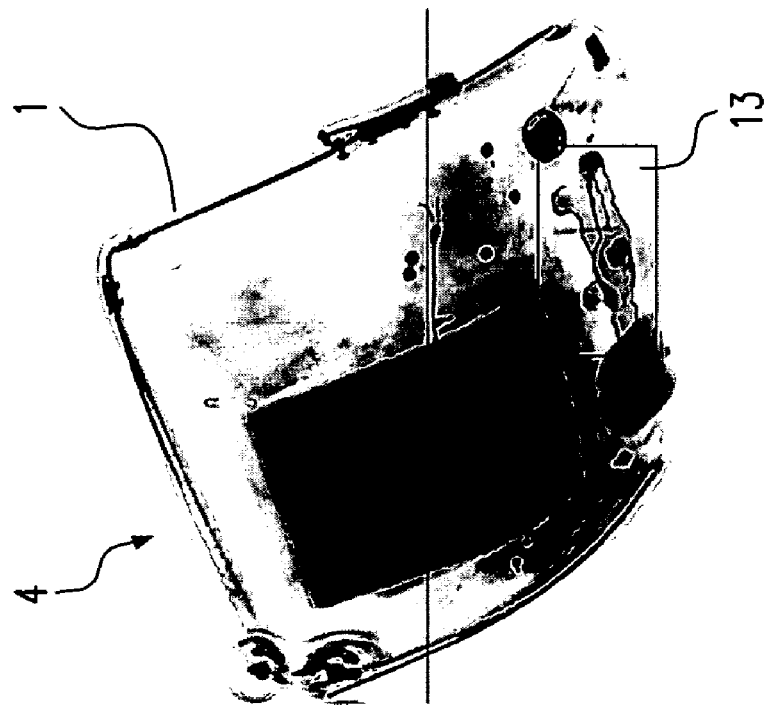

The principle of the invention which has been described in detail above with reference to FIGS. 1 to 6 can be summarized as follows with reference to FIG. 7:

A first transmission image 1 of an item of luggage 4 from a first-stage apparatus 100 (left-hand side) is compared 104 with a second transmission image 2 of the same item of luggage 4 of a further transmission apparatus 102. The item of luggage 4 has been both rotated and flipped. On the basis of the implemented method according to the invention, an allocation of the first suspect region 13 (which is drawn in as a rectangle for clarity) to the second suspect region 23 is quite easily achieved.

To greatly reduce the analysis time, in a second-stage apparatus 102 a further analysis is carried out only of the second suspect region 23 which has been classified as suspect in a first transmission image 1 in a first-stage apparatus 100. The coordinates of the first suspect region 13 ascertained by the first-stage apparatus and a line-scan image are transmitted to the second-stage apparatus. As both apparatuses are physically separated from each other and the item of luggage 4 is thus usually brought via different transport systems from the first-stage apparatus to the second-stage apparatus, the coordinates must be adapted to the new position of the item of luggage 4. For this the second-stage apparatus is also equipped with a line scanner. After the scanning of the second transmission image 2, the two transmission images 1, 2 are each subjected to a pre-processing 10, 20 by means of a calibration with the result that they can be compared 104 to one another. This is followed in each case by a features extraction 11, 21 by means of global and/or local features for each of the two transmission images 1, 2. On the basis of the features obtained from the two features extractions 11, 21, the change in position of the object 4 can be calculated or determined 106 by means of a comparison 104. It is thereby possible that only the second suspect region 23 is also analyzed in the second-stage apparatus, and no longer the whole object 4. The method according to the invention thus saves a great deal of time during the analysis of the object 4 without the detection rate falling or the false alarm rate increasing.

What is claimed is:

1. A method for determining the change in position of an item of luggage in order to examine a suspect region in this item of luggage, the method comprising:

taking a first picture of the item of luggage by a first examination system;

conveying the item of luggage from the first examination system to a second examination system which is physically separated from the first examination system;

transferring the first picture of the item of luggage and of coordinates of a first suspect region in the item of luggage from the first examination system to the second examination system;

taking a second picture of the item of luggage (4) by the second examination system;

comparing the two pictures of the item of luggage of the first and second examination systems;

determining the change in position of the item of luggage giving a first angle of rotation about the vertical axis, a second angle of rotation about the horizontal axis and a translation;

determining the coordinates of the second suspect region which corresponds to the first suspect region in the first examination system in the second examination system; and performing targeted examination of the item of luggage only in the area of the coordinates of the second suspect region in the second examination system.

2. The method according to claim 1, wherein a picture of a first transmission image is taken in the first examination system and a first suspect region in the item of luggage is determined by a first transmission apparatus.

3. The method according to claim 2, wherein an optical or geometrical pre-processing of the first or second transmission image takes place before the determination of the change in position.

4. The method according to claim 1, wherein several sets of first or second angles of rotation are issued in the case of ambiguities.

5. The method according to claim 4, wherein a probability value is given in each case for the first or second angles of rotation.

6. The method according to claim 1, wherein the change in position of the item of luggage is determined using global features, in particular correlation, mutual information or radial dimensional variables.

7. The method according to claim 6, wherein determining the change in position of the item of luggage and/or determining the coordinates includes a scale analysis.

8. The method according to claim 6, wherein various comparison values are used.

9. The method according to claim 1, wherein the change in position of the item of luggage is determined using local features, including RANSAC, robust estimation methods, Hough transformations or least-square methods.

10. The method according to claim 9, wherein determining the change in position of the item of luggage and/or determining the coordinates includes a scale analysis.

11. The method according to claim 9, wherein the determination of the change in position using local features takes place on different linear scales.

12. The method according to claim 11, wherein the local features are chosen according to the linear scale.

13. The method according to claim 1, wherein a comparison takes place of the results of the analysis using the global features with the results of the analysis using the local features.

14. The method according to claim 1, wherein only the local features are used which do not contradict the analysis using the global features.

* * * * *